United States Patent Office 3,294,715
Patented Dec. 27, 1966

3,294,715
PHENOLIC RESIN ADHESIVE EXTENDED WITH CAUSTICIZED LIGNITE
Fred Bryner, Midland, Mich., assignor to The Dow Chemical Company, Midland, Mich., a corporation of Delaware
No Drawing. Filed Aug. 1, 1962, Ser. No. 213,879
6 Claims. (Cl. 260—17.2)

The present invention relates to novel adhesive compositions and articles manufactured threwith. More particularly, the invention concerns providing highly extended phenolic resin adhesives which are well adapted for the manufacture of exterior grade plywoods.

The use of partially condensed phenol-aldehyde resins in thermosetting, adhesive formulations is a well-established art. Most of such formulations, when ready for use, comprise, in addition to the resin, a liquid solvent medium, a catalyst to promote resin cure, an extender or filler and sometimes special additives to control such characteristics of the glue as its flow-ability, rate of cure, spreadability or viscosity.

Of primary concern herein are the extenders for phenolic resins, i.e., materials added to reduce the quantity of resin solids required in a given adhesive formulation. In the past, various extenders have been indicated to be useful in amounts up to as much as one part by weight per part by weight of resin solids. At such levels of extension, however, the adhesive formulations have generally been inadequate for the manufacture of exterior grade plywoods according to Douglas Fir Plywood Association standards. For a definition of these standards, see the publication "Douglas Fir Plywood Commercial Standard CS45–55."

A good extender in the prior art is that taught by Ash et al. in U.S. Patent 2,727,869. While this patent discloses that up to about 100 percent extension with the particular organic filler described therein is permissible, a maximum extension within the range from about 25 to 65 percent based on the resin solids must be observed if the exterior grade plywood is to be manufactured with the resulting glue.

It would be desirable to provide a highly extended, liquid adhesive composition based on thermosetting phenolic resins. It would be especially desirable to provide a liquid phenolic resin adhesive formulation, suitable for the manufacture of exterior grade plywood, characterized by substantially greater extension of the resin than that heretofore attained in such adhesive formulations. These and other objectives are accomplished in the present invention which is hereinafter set forth.

According to the present invention, an improved, highly extended phenolic resin adhesive formulation is obtained by uniformly mixing with a liquid, aqueous phenolic resin, a material proportion, e.g., from about 0.2 part up to about 2 parts by weight per part of the phenolic resin solids, of finely divided, causticized lignite. The formulation is completed by the addition of a catalyst for the thermosetting reaction of the resin and a sufficient amount of an aqueous dispersing medium to provide a liquid composition.

To prepare the causticized lignite, the usual procedure is to first grind a dry lignite to a desired particle size and thereafter uniformly mix the finely divided lignite with sufficient liquid, aqueous caustic to provide from about 2 to 15 percent by weight caustic solids based on the total weight of dry lignite and resin solids in the complete formulation. Enough water is incorporated into the mixture, either by separate addition thereof or by addition with the caustic to produce a consistency convenient for mixing.

The word, "caustic," refers to any one of, or mixture of, the alkali metal hydroxides. "Dry lignite" means lignite from which the free moisture has been removed, as by seasoning at normal room temperatures, and the terminology, "finely divided," as applied to the lignite, means an average particle size small enough to pass through an 80 mesh screen, preferably a 160 mesh screen, of the Tyler mesh series.

Phenolic resins suitable for employment in the invention are thermosetting, base catalyzed, resinous condensation products (soluble in aqueous solvents) of one or more hydroxy aromatic compounds (phenols) and one or more suitable aldehydic materials. "Aldehydic," as employed herein, refers to aldehydes and similarly acting materials. From about 1.8 to about 3, preferably from 2.0 to 2.3 chemical equivalents of the aldehydic material are reacted with each mole of the phenol used. Particular resinous products are obtained by partially condensing, in appropriate proportions to provide a thermosetting product, a phenol, such as phenol, cresol, resorcinol, 3,5-xylenol, with a suitable aldehydic material. Specific examples of suitable aldehydes, or similarly acting materials, are aqueous formaldehyde, paraformaldehyde, trioxymethylene and the like methylene providing materials. Also operable are acetaldehyde, furfuraldehyde and the like aldehydic materials which react with the mentioned phenols to form soluble, intermediate, polycondensation products.

It will be observed that the phenols specified are those having at least 3 reactive ring positions, i.e., at least 3 nuclear carbon atoms having substituent hydrogen atoms in ring positions ortho and para to a hydroxy group. If desired, other phenols having less than three active positions can be used in admixture with one or more of the above-mentioned phenols, but it is essential in order to provide a thermosetting composition that at least the predominant portion of the phenolic reactant employed is of the class having 3 active ring positions.

The above thermosetting phenolic resins are normally prepared in the presence of an aqueous solvent with the aid of a basic catalyst. The usual procedure is to mix desired proportions of the resin forming reactants into a sufficient amount of an aqueous solvent to provide a liquid reaction system having from about 30 to about 60, preferably 38 to 50, percent by weight solids. A basic catalyst is added to the reaction mixture and the resulting system is heated at an elevated temperature to provide a partially condensed, fusible resin, which is at least water-dispersible in the presence of alkali, if not completely soluble in the presence of alkali. Exemplary aqueous solvents include, in addition to water, mixtures of water with lower, water-soluble alcohols and ketones. Generally, any organic solvent miscible with water and essentially inert to the condensing reactants is used as the reaction medium.

The catalyst material used to promote thermosetting or curing of the phenol-aldehyde resin is basic in nature and may be inorganic or organic. Examples of suitable basic catalysts are the alkali metal hydroxides, alkali metal carbonates, alkali metal silicates, alkali metal borates, alkali metal phosphates, ammonium hydroxide or such water-soluble basic organic compounds as the amines including primary, secondary and tertiary alkylamines or arylamines. Examples of the latter materials are methylamine, dimethylamine, trimethylamine, ethylenimine, pyridine, aniline and the like. A preferred catalyst system utilizes an alkali metal carbonate in an amount of from 2 to 30 percent by weight based on the resin solids.

The phenolic resin and causticized lignite are dissolved or dispersed, as the case may be, in a sufficient amount of an aqueous solvent medium, which may be water or mixtures thereof with a water-soluble alcohol, to provide a readily flowable or mechanically spreadable composition.

For most applications, the total solids of the extended glue compositions of the invention are within the range from about 35 to about 65 percent by weight of the total composition. Preferably, the solids content of the glue composition is within the range from about 40 to 55 percent by weight of the total composition.

Adhesive compositions of the invention, with a total extension of as much as 150 percent, i.e., 1.5 parts of causticized lignite per part of resin solids, are suitable for the manufacture of exterior grade plywood. When lesser grades of plywood are desired, effective results are accomplished with the levels of extension as great as 200 percent or more based on the resin solids used.

The aforedescribed glue formulations can be prepared from the specified constituents by introducing them in any order into a vessel suitably equipped with agitating means. They are stirred or otherwise mixed, preferably at room temperature, until a uniform blend of a desired consistency is obtained. The blend consistency can be controlled by one or more techniques such as adjusting the amount of aqueous solvent medium used within the aforementioned limits or by adding an optional viscosity modifier such as a water-soluble gum. A preferred operating procedure involves introducing the finely ground lignite into the vessel and thereafter causticizing the lignite, either with, or without, the presence of the phenolic resin and catalyst.

Water-soluble gums suitable for use as viscosity modifiers include the naturally occurring and synthetic gums such as gumarabic, karaya gum, locust bean gum, alginate, casein, soluble blood albumin and the water-soluble cellulose ethers such as methyl cellulose, hydroxyethyl cellulose and the like. Usually from about 0.01 to 0.1 part of such gums per part of resin solids produces a satisfactory increase in viscosity.

The extended adhesive formulations prepared in accordance with the invention are well adapted for the bonding of wood veneers to provide plywoods. Such adhesive formulations are spread on the wood plies in amounts ranging from about 18 to about 30 pounds of total solids per thousand square feet of double glue line. The assembly time can vary from about 5 to about 30 minutes or more and preferably from 10 to about 20 minutes. The press time for satisfactory results can be within the range from about 3 to about 10 minutes or more depending upon the temperature of the platens, the number of plies being bonded, the number of panels per opening and the like considerations, such as are apparent to those skilled in the art. After having been pressed and thoroughly cured at the bonding temperature for the glue formulation, the plywood is removed from the press and stacked for conditioning to a suitable residual moisture content.

In a specific embodiment of the invention, a glue formulation was prepared according to the following schedule.

| Component | Amount (grams) | Mixing Time (minutes) |
| --- | --- | --- |
| Lignite | 10.63 | |
| $Na_2CO_3$ | 1 | |
| Water | 15 | 2 |
| 50 Percent Aqueous NaOH | 1.33 | 10 |
| Phenolic Resin [1] | 5 | 2 |
| 50 Percent Aqueous NaOH | 1.33 | 5 |
| $Na_2CO_3$ | 0.6 | 5 |
| Phenolic Resin [1] | 20 | 5 |

[1] Thermosettable, base catalyzed, intermediate condensation resin of phenol and formaldehyde in water, the aqueous solution containing 42.5 percent resin solids.

A panel, 6 x 6 inches, 3 ply, was constructed of ⅛ inch Douglas Fir Heartwood veneer. The above prepared glue formulation was spread on the veneer with a brush at a spread rate of 48.3 pounds per 1,000 square feet of double glue line. This panel was given a closed assembly for 5 minutes, after which time the panel construction was pressed at a platen temperature of 275° F. for 3.5 minutes under 200 p.s.i.

Two specimens, 1 x 3 inches, were cut from the resulting plywood panel for shear testing. The specimens were first subjected to boiling water for 4 hours and then sheared at the glue lines with a knife edge while wet. The average percentage wood failure as the result of such testing was determined by visual observation to be 75 percent.

What is claimed is:
1. A liquid adhesive composition comprising:
 (a) a water-soluble, thermosetting, phenolic aldehydic resin,
 (b) a material proportion of a finely divided, causticized lignite,
 (c) a catalytic amount of a basic, alkali metal catalyst suitable for initiating the thermosetting reaction of the resin, and
 (d) sufficient water such that the total solids of the liquid adhesive composition is within the range from about 35 to about 65 percent by weight of the total composition.

2. A liquid adhesive composition as in claim 1 wherein the resin is a water-soluble, thermosetting resin obtained by partially condensing, in the presence of a basic catalyst and aqueous solvent, from about 1.8 to about 3 moles of formaldehyde with each mole of phenol.

3. A liquid adhesive composition as in claim 1 wherein the catalyst is an alkali metal carbonate.

4. A method for the production of a highly extended, liquid, phenolic resin adhesive composition which comprises mixing together in any order:
 (1) one part by weight of a water-soluble, thermosetting, phenolic aldehydic resin,
 (2) from about 0.2 part up to about 2 parts by weight of a finely divided, causticized lignite obtained by mixing the finely divided lignite in the presence of water, with from 2 to 15 percent by weight caustic, based on the total weight of the dry lignite and resin solids,
 (3) a catalytic amount of a basic, alkali metal catalyst suitable for initiating the thermosetting reaction of the resin, and
 (4) sufficient water such that the total solids of the liquid adhesive compositions are within the range from about 35 to about 65 percent by weight of the total composition.

5. A method as in claim 4 wherein the phenolic resin employed is a water-soluble, thermosetting resin obtained by partially condensing, in the presence of a basic catalyst and aqueous solvent, from about 1.8 to about 3 moles of formaldehyde with each mole of phenol.

6. A method as in claim 4 wherein the catalyst is an alkali metal carbonate.

References Cited by the Examiner

UNITED STATES PATENTS

| | | | |
| --- | --- | --- | --- |
| 2,629,698 | 2/1953 | Sterling | 260—2.5 |
| 2,727,869 | 12/1955 | Ash et al. | 260—17.2 |
| 3,093,604 | 6/1963 | Ayers | 260—17.2 |

WILLIAM H. SHORT, *Primary Examiner.*

LEON J. BERCOVITZ, *Examiner.*

J. NORRIS, *Assistant Examiner.*